United States Patent
Ban

(10) Patent No.: US 7,383,743 B2
(45) Date of Patent: Jun. 10, 2008

(54) DEVICE FOR DETECTING A ROTATION DEVICE

(75) Inventor: Takao Ban, Toyohashi (JP)

(73) Assignee: Denso Corporation (JP)

( * ) Notice: Subject to any disclaimer, the term of this patent is extended or adjusted under 35 U.S.C. 154(b) by 190 days.

(21) Appl. No.: 11/171,257

(22) Filed: Jul. 1, 2005

(65) Prior Publication Data
US 2006/0006860 A1    Jan. 12, 2006

(30) Foreign Application Priority Data
Jul. 6, 2004    (JP)    ............................. 2004-199485

(51) Int. Cl.
*G01L 3/14* (2006.01)
(52) U.S. Cl. .................................. 73/862.37
(58) Field of Classification Search .............. 73/862.37
See application file for complete search history.

(56) References Cited

U.S. PATENT DOCUMENTS 2,566,274 A * 8/1951 White et al. ................. 202/205
4,329,636 A * 5/1982 Uchida et al. .............. 318/721
4,914,713 A * 4/1990 Mueller et al. ............. 388/805
2005/0122095 A1* 6/2005 Dooley ....................... 324/174

FOREIGN PATENT DOCUMENTS

JP    2003-240788    8/2003

* cited by examiner

*Primary Examiner*—Edward Lefkowitz
*Assistant Examiner*—Octavia Davis
(74) *Attorney, Agent, or Firm*—Nixon & Vanderhye PC

(57) ABSTRACT

There are provided a device for detecting a rotation rate that prevents an eddy current from being generated in a housing member around a rotation rate sensor, and a device for detecting a rotation rate that prevents a decrease in the compressing efficiency of a fluid compressed by a rotor. A slit-shaped concave portion for preventing a generation of an eddy current is formed on the housing on both side of the rotation sensor. The rotation rate sensor generates a magnetic field by being supplied with a high-frequency alternating excitation current. The concave portion prevents an eddy current from being generated in the housing around the rotation rate sensor based on the magnetic field generated by the coil. The concave portion has a small capacity, and is formed along the flow of intake air. As a result, a decrease in the compression efficiency of the blades of the suction-side turbine can be prevented.

8 Claims, 4 Drawing Sheets

DEVICE FOR DETECTING A ROTATION DEVICE

BACKGROUND OF THE INVENTION

1. Field of the Invention

The present invention relates to a device for detecting a rotation rate that detects a rotation rate of a rotor which applies pressure to a fluid, in the path of the fluid, due to the rotation of the rotor.

2. Description of the Related Art

Conventionally, a device for detecting a rotation rate is known that detects a rotation rate of a turbine of a turbocharger which applies pressure to air to compress it and to force the compressed air into a combustion chamber.

For example, according to a device for detecting a rotation rate disclosed in Japanese Patent Application Unexamined Publication No. 2003-240788, a sensor detects a pressure or a sound generated by the rotation of a rotor in order to detect the rotation rate of the rotor. Further, as shown in FIG. 4A and FIG. 4B, a device for detecting a rotation rate uses an eddy current sensor 110 to detect a rotation rate of a turbine. A plurality of blades 104 are formed on the turbine in the radius direction.

The eddy current sensor 110 shown in FIG. 4A and FIG. 4B is disposed on a housing member 100 forming the path of the fluid, so as to face the blades 104 of the turbine. The eddy current sensor 110 has a coil 112 that generates a magnetic field based on an alternating excitation current. When the blades 104 pass through the magnetic field generated by the coil 112, an eddy current is generated in the blades 104 to offset the magnetic field generated by the coil 112. The intensity of the magnetic field changes due to the eddy current generated in the blades 104, thereby changing the current that flows through the coil 112. As a result, the eddy current sensor 110 detects that the blades 104 pass through the magnetic field. The device for detecting a rotation rate detects a rotation rate of the turbine by detecting a change in the current that passes through the coil 112.

When a high-frequency alternating excitation current is supplied to the coil 112, an eddy current is generated in the housing member 100 around the eddy current sensor 110 due to a factor other than the rotation of the blades 104. When the eddy current is generated in the housing member 100, the eddy current sensor 110 cannot determine whether the current generated in the coil 112, due to a change in the intensity of the magnetic field, changes because of the eddy current generated in the housing member or because of the blades 104 that pass through the magnetic field. When the intensity of the magnetic field generated by the coil 112 decreases due to the eddy current generated in the housing member 100, the eddy current generated in the blades 104 becomes small when the blades 104 pass through the magnetic field. At the same time, when the blades 104 pass through the magnetic field, the current generated in the coil 112 also becomes small. As a result, it becomes difficult to detect the blades 104 that pass through the magnetic field, and there is a possibility that the device for detecting a rotation rate cannot detect the rotation rate of the turbine.

Accordingly, as shown in FIG. 4A and FIG. 4B, when a concave portion 102 is formed in a ring shape on the housing member 100 to cover the surrounding of the eddy current sensor 110, the concave portion 102 can prevent an eddy current from being generated in the housing member 100 around the eddy current sensor 110.

However, when the ring-shaped concave portion 102 is formed around the eddy current sensor 110 as shown in FIG. 4A and FIG. 4B, a part of air that is about to be compressed by the rotation of the blades 104 passes through the concave portion 102 and flows downstream, instead of passing through between the blades 104 and the surface of the path of the fluid formed on the housing member 100. Consequently, the compression efficiency of the blades 104 decreases.

SUMMARY OF THE INVENTION

It is an object of the present invention to provide a device for detecting a rotation rate that can prevent an eddy current from being generated in a housing member around a rotation rate sensor.

It is another object of the invention to provide a device for detecting a rotation rate that can prevent a decrease in the compression efficiency of a fluid compressed by a rotor.

It is still another object of the invention to provide a device for detecting a rotation rate that can prevent an eddy current from being generated in a housing member around a rotation rate sensor and can prevent a decrease in the compression efficiency of a fluid compressed by a rotor.

According to one aspect of the present invention, a concave portion for preventing generation of an eddy current is formed on a housing member around a rotation rate sensor of a device for detecting a rotation rate, and a non-conductive material is filled in the concave portion for preventing generation of an eddy current.

According to this configuration, even when an alternating excitation current is supplied to a magnetic-field generator of the rotation rate sensor, the concave portion for preventing generation of an eddy current prevents an eddy current from being generated in the housing member around the rotation rate sensor. Therefore, a decrease in the intensity of the magnetic field generated by the rotation rate sensor can be prevented. Accordingly, when the rotor passes through the magnetic field, a decrease in the eddy current generated in the rotor can be prevented. As a result, when the rotor passes through the magnetic field generated by the magnetic-field generator, a decrease in the change of a current that flows through the magnetic-field generator can be prevented. Consequently, the device for detecting a rotation rate according to the present invention can detect the rotor that passes through the magnetic field, and can detect a rotation rate of the rotor.

The nonconductive material filled in the concave portion can prevent a fluid from passing through the concave portion. When the nonconductive material is filled in the concave portion, a resistance to the fluid that flows above the concave portion can be decreased. As a result, a decrease in the compression efficiency of the fluid compressed by the rotor can be prevented.

According to another aspect of the present invention, a slit-shaped concave portion for preventing an eddy current is formed on the housing member on both sides of a rotation rate sensor.

According to this configuration, even when an alternating excitation current is supplied to a magnetic-field generator of the rotation rate sensor, the slit-shaped concave portion for preventing an eddy current prevents an eddy current from being generated in the housing member at the external periphery of the rotation rate sensor. As a result, when the rotor passes through the magnetic field generated by the magnetic-field sensor, a decrease in the change of a current that flows through the magnetic-field generator can be prevented. Consequently, the device for detecting a rotation rate according to the present invention can detect the rotor that passes through the magnetic field, and can detect a rotation rate of the rotor.

Further, because the concave portion is formed in a slit shape, the amount of a fluid that flows through the concave portion can be decreased. As a result, a decrease in the compression efficiency of the fluid compressed by the rotor can be prevented.

Preferably, because the slit-shaped concave portion for preventing an eddy current extends along a direction to which the fluid flows, a resistance to the flow of the fluid that passes through the concave portion can be decreased. As a result, a decrease in the compression efficiency of the fluid compressed by the rotor can be prevented.

According to still another aspect of the present invention, the rotation rate of a turbine of a turbocharger is detected using the device for detecting a rotation rate. As a result, a decrease in the compression efficiency of the turbine can be prevented.

DETAILED DESCRIPTIONS

Devices for detecting rotation rates according to embodiments of the present invention are explained below with reference to the drawings.

Figure 1A:
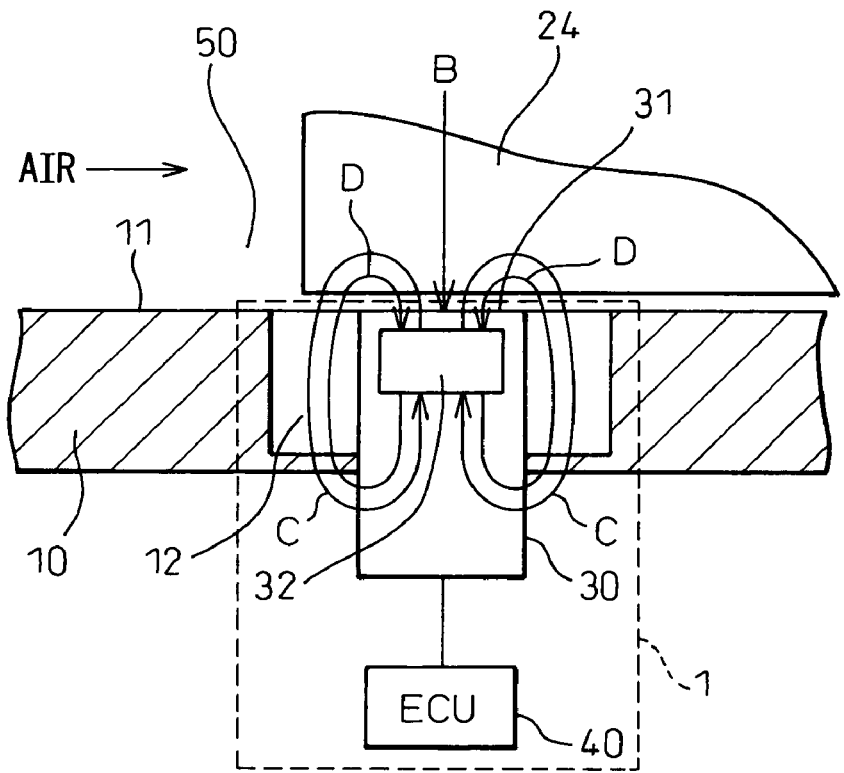
FIG. 1A is a schematic sectional diagram of a device for detecting a rotation rate according to a first embodiment of the present invention.
Figure 1B:
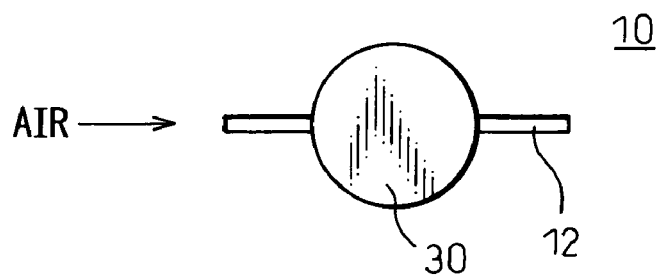
FIG. 1B is a top plan view of the device for detecting a rotation rate in a direction of an arrowhead B in FIG. 1A according to the first embodiment.

FIG. 1A and FIG. 1B are schematic diagrams of a device for detecting a rotation rate according to a first embodiment of the present invention.

Figure 2:
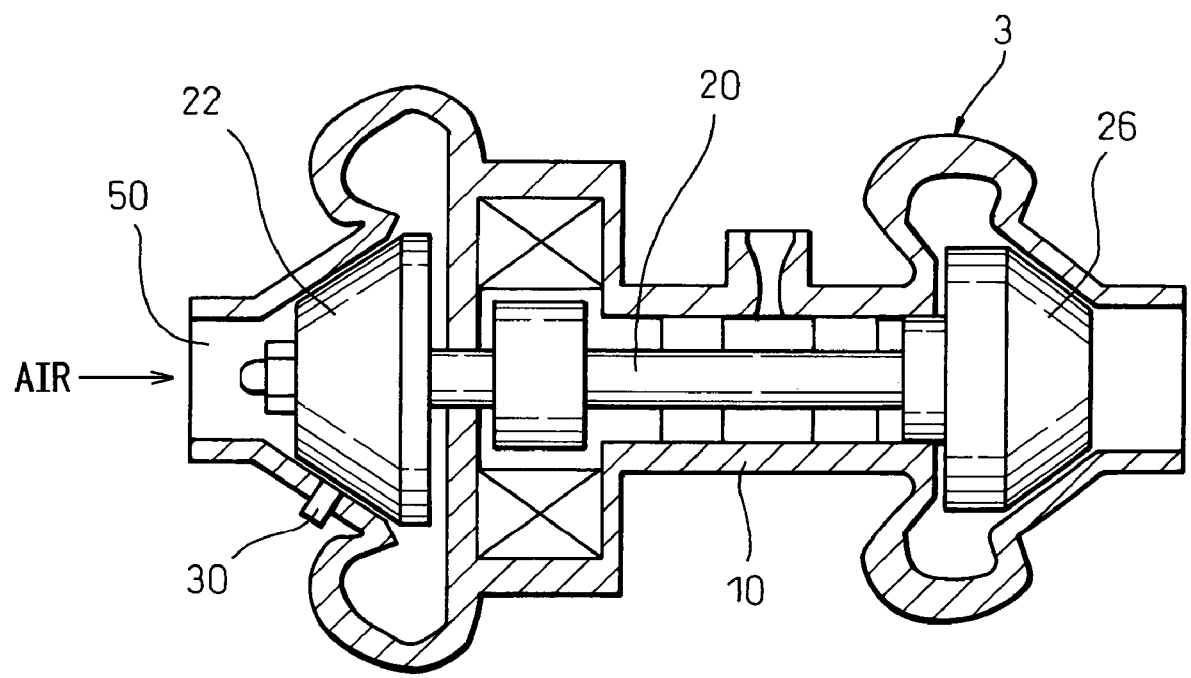
FIG. 2 is a schematic sectional diagram of a turbocharger that uses the device for detecting a rotation rate according to the present invention.

FIG. 2 is a schematic sectional diagram of a turbocharger that uses the device for detecting a rotation rate according to the first embodiment. A turbocharger 3 has a housing 10, a shaft 20, a suction-side turbine 22, an exhaust-side turbine 26, and a rotation rate sensor 30.

When the exhaust-side turbine 26 rotates due to a flow of exhaust gas, the suction-side turbine 22 as a rotor rotates together with the shaft 20, compresses air absorbed into a suction path 50 within the housing 10 that forms a path of the fluid, and forces the compressed air into a combustion chamber. The suction-side turbine 22 has plural blades in the rotation direction. The blades 24 correspond to those described in claims.

The rotation rate sensor 30 is an eddy current sensor, and is disposed to face the suction-side turbine 22, in the housing 10 that is disposed on the external periphery of the suction-side turbine 22. As shown in FIG. 1A and FIG. 1B, a surface 31 of the rotation rate sensor 30 that faces the blades 24 is on substantially the same plane as a path surface 11 of the housing 10. A slit-shaped concave portion for preventing an eddy current 12 is formed adjacently to the rotation rate sensor 30 and along the direction to which intake air flow at both radial directions of the rotation rate sensor 30, on the housing 10 that covers the external periphery of the rotation rate sensor 30. It is preferable that a distance between the rotation rate sensor 30 and each blade 24 is as small as possible while not interrupting the rotation of the blade 24 so that the rotation rate sensor 30 can obtain a sufficient sensitivity. For example, this distance is set within a range from 0.5 mm to 1 mm. A depth of the concave portion 12 is set within a range from 20 mm to 30 mm in order to prevent the generation of an eddy current as described later.

As shown in FIG. 1A and FIG. 1B, the rotation rate sensor 30 has a coil 32 as a magnetic-field generator, and a driving circuit that supplies a high-frequency alternating excitation current to the coil 32. The frequency of the alternating excitation current is set to a level at which the rotation rate sensor 30 can detect each blade 24 passing through the magnetic field generated by the coil 32, based on the rotation rate of the suction-side turbine 22. The coil 32 to which the alternating excitation current is supplied generates a magnetic flux in the indicated directions C or D, thereby forming a magnetic field. An electronic control unit (ECU) 40 detects a change in the current that flows through the coil 32. The housing 10, the rotation rate sensor 30, and the ECU 40 constitute the device for detecting a rotation rate 1 according to the first embodiment of the present invention.

The operation of the device for detecting a rotation rate 1 according to the first embodiment is explained below.

When the suction-side turbine 22 rotates together with the exhaust-side turbine 26, each blade 24 of the suction-side turbine 22 passes through the magnetic field generated by the coil 32. At this time, an eddy current is generated in each blade 24 to offset the magnetic field generated by the coil 32. When the intensity of the magnetic field generated by the coil 32 changes due to the eddy current generated in each blade 24, a current that flows through the coil 32 of the rotation rate sensor 30 changes. The rotation rate sensor 30 detects the generation of the eddy current in each blade 24, based on the change in the current that flows through the coil 32. The ECU 40 detects a change in the current that flows through the coil 32, and detects that the blade 24 passes through the magnetic field generated by the coil 32. As a result, the device for detecting a rotation rate 1 can detect the rotation rate of the suction-side turbine 22.

When an alternating excitation current is supplied to the coil 32 like in the first embodiment, an eddy current is generated in a conductive material that covers the surrounding of the rotation rate sensor 30. This eddy current works to decrease the intensity of the magnetic field generated by the coil 32. When the intensity of the magnetic field generated by the coil 32 decreases, it becomes difficult to detect that the blade 24 passes through the magnetic field.

According to the first embodiment, the slit-shaped concave portion 12 is formed to extend to the radial directions of the rotation rate sensor 30 as shown in FIG. 1B. Therefore, even when an alternating excitation current is supplied to the coil 32, the concave portion 12 interrupts a flow of an eddy current that is about to be generated in the housing 10 around the rotation rate sensor 30. As a result, the concave portion 12 prevents an eddy current from being generated in the housing 10 that covers the surrounding of the rotation rate sensor 30. Therefore, the ECU 40 detects a change in the current that flows through the coil 32 when the blade 24 passes through the magnetic field generated by the coil 32. Consequently, the device for detecting a rotation rate 1 can detect the rotation rate of the suction-side turbine 22.

Because the concave portion 12 is formed in a slit shape, the amount of intake air that flows to the concave portion 12 is small. As a result, a decrease in the compression efficiency of the fluid compressed by the blades of the suction-side turbine 22 can be prevented.

Because the slit-shaped concave portion 12 is formed to extend to a direction to which the intake air flows, a resistance to the flow of the intake air that passes through the concave portion 12 can be decreased. As a result, a decrease in the compression efficiency of the blades of the suction-side turbine 22 can be prevented.

Figure 3A:
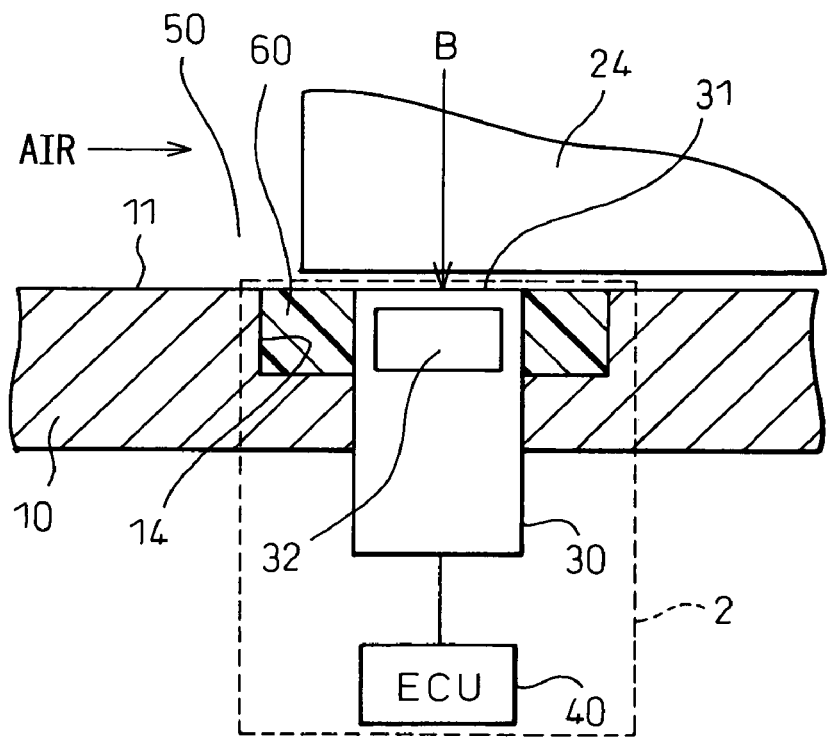
FIG. 3A is a schematic sectional diagram of a device for detecting a rotation rate according to a second embodiment of the present invention.
Figure 3B:
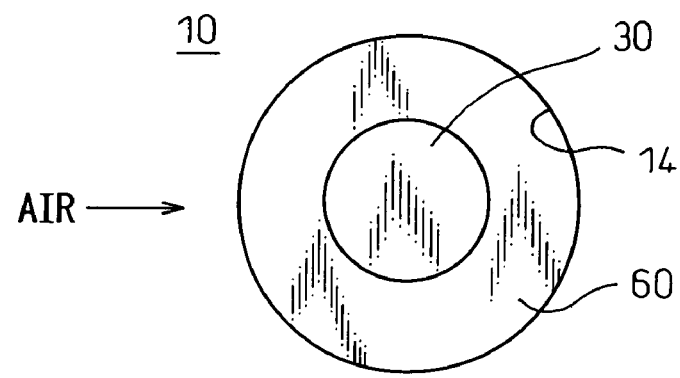
FIG. 3B is a top plan view of the device for detecting a rotation rate in a direction of an arrowhead B in FIG. 3A according to the second embodiment.
Figure 4A:
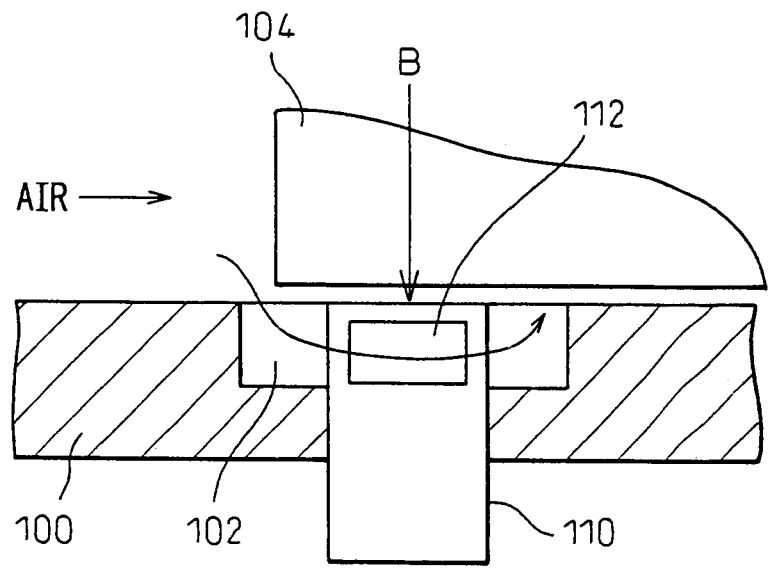
FIG. 4A is a schematic sectional diagram of a conventional device for detecting a rotation rate.
Figure 4B:
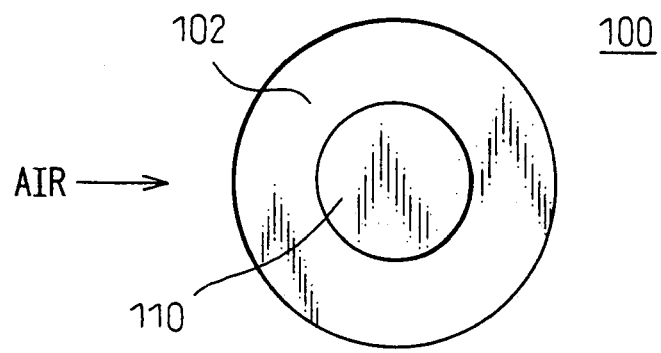
FIG. 4B is a top plan view of the conventional device for detecting a rotation rate in a direction of an arrowhead B in FIG. 4A.

FIG. 3A and FIG. 3B are schematic diagrams of a device for detecting a rotation rate according to a second embodiment of the present invention. Constituent parts of the device for detecting a rotation rate 2 that are substantially identical with those of the device for detecting a rotation rate 1 according to the first embodiment are assigned with like reference numerals, and their explanation is omitted.

In the device for detecting a rotation rate 2 according to the second embodiment, a ring-shaped concave portion 14 for preventing a generation of an eddy current is formed around the rotation rate sensor 30, on the housing 10 that covers the external periphery of the rotation rate sensor 30, as shown in FIG. 3A and FIG. 3B. A depth of the concave portion 14 is set within a range from 20 mm to 30 mm. An nonconductive material 60 such as epoxy resin is filled in the concave portion 14.

Based on the above configuration, even when an alternating excitation current is supplied to the coil 32, the concave portion 14 and the epoxy resin 60 interrupt a flow of an eddy current that is about to be generated in the housing 10 around the rotation rate sensor 30. Therefore, the concave portion 14 and the epoxy resin 60 prevent the generation of an eddy current in the housing 10 that covers the surrounding of the rotation rate sensor 30. The ECU 40 detects a change in the current that is generated in the coil 32 when the blade 24 passes through the magnetic field generated by the coil 32. Consequently, the device for detecting a rotation rate can detect the rotation rate of the suction-side turbine 22.

Because the epoxy resin 60 is filled in the concave portion 14, the intake air does not flow through the concave portion 14, and there is little resistance to the intake air that flows above the concave portion 14. As a result, a decrease in the compression efficiency of the intake air compressed by the blades of the suction-side turbine 22 can be prevented.

According to the first embodiment, while the slit-shaped concave portion 12 is formed along the direction in which the intake air flows to the rotation rate sensor 30, the formation of the concave portion 12 is not limited to this direction. The slit-shaped concave portion can be formed to any direction of the rotation rate sensor 30. There is no limit to the number of the slit-shaped concave portions.

According to the second embodiment, while the concave portion 14 is formed in a ring shape, the shape is not limited to the ring shape. A concave portion having any shape can be formed on the external periphery of the rotation rate sensor 30, so long as the concave portion prevents an eddy current from being generated in the housing 10 that covers the external periphery of the rotation rate sensor 30 and the nonconductive material is filled in the concave portion.

The nonconductive material to be filled in the concave portion 14 can be solidified after being charged into the concave portion. Alternatively, a nonconductive material that is formed in advance can be embedded into the concave portion. As a nonconductive material to be filled in the concave portion, a nonconductive material other than the epoxy resin can be also used.

In the above embodiments, while the present invention is employed as a device for detecting a rotation rate that detects the rotation rate of the suction-side turbine 22 of the turbocharger, the application of the invention is not limited to this. The device for detecting a rotation rate according to the present invention can be also used to detect a rotation rate of any rotor, so long as the device for detecting a rotation rate detects the rotation rate of a rotor that applies a pressure to a fluid in a path based on the rotation. The fluid to which the rotor applies a pressure is not limited to a gas but can be a liquid.

What is claimed is:

1. A device for detecting a rotation rate that detects a rotation rate of a rotor that applies a pressure to a fluid based on the rotation, the device comprising:
   a housing member that is disposed on the external periphery of the rotor;
   a rotation rate sensor, that detects an eddy current that is generated when the rotor passes through the magnetic field, wherein the rotation rate sensor detects a rotation of the rotor, is disposed opposite to the rotor on the housing member, and generates a magnetic field based on an alternating excitation current; and
   a slit-shaped concave portion for preventing an eddy current that is formed to extend radially in the housing member as first and second slits from diametrically opposite sides of the rotation rate sensor, wherein each of said first and second slits has a width less than a width of the rotation rate sensor.

2. The device for detecting a rotation rate according to claim 1, wherein the rotor is a turbine of a turbocharger.

3. The device for detecting a rotation rate according to claim 1, wherein the rotor comprises a plurality of blades in the rotation direction, and the rotation rate sensor detects an eddy current that is generated in the blades when the blades pass through the magnetic field.

4. The device for detecting a rotation rate according to claim 3, wherein the rotor is a turbine of a turbocharger.

5. The device for detecting a rotation rate according to claim 1, wherein the slit-shaped concave portion for preventing a generation of an eddy current extends along a flow direction of the fluid.

6. The device for detecting a rotation rate according to claim 5, wherein the rotor is a turbine of a turbocharger.

7. The device for detecting a rotation rate according to claim 5, wherein the rotor comprises a plurality of blades in the rotation direction, and the rotation rate sensor detects an eddy current that is generated in the blades when the blades pass through the magnetic field.

8. The device for detecting a rotation rate according to claim 7, wherein the rotor is a turbine of a turbocharger.

* * * * *